(12) United States Patent
Ide et al.

(10) Patent No.: US 9,129,545 B2
(45) Date of Patent: Sep. 8, 2015

(54) LCD DEVICE

(75) Inventors: Tetsuya Ide, Osaka (JP); Tsuyoshi Kamada, Osaka (JP); Seiji Ohhashi, Osaka (JP); Shohei Katsuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 13/517,098

(22) PCT Filed: Jan. 12, 2011

(86) PCT No.: PCT/JP2011/050344
§ 371 (c)(1),
(2), (4) Date: Jun. 19, 2012

(87) PCT Pub. No.: WO2011/087015
PCT Pub. Date: Jul. 21, 2011

(65) Prior Publication Data
US 2012/0256889 A1 Oct. 11, 2012

(30) Foreign Application Priority Data
Jan. 13, 2010 (JP) .................. 2010-005253

(51) Int. Cl.
*G06F 3/038* (2013.01)
*G09G 5/00* (2006.01)
(Continued)

(52) U.S. Cl.
CPC .......... *G09G 3/003* (2013.01); *G02F 1/133382* (2013.01); *G09G 3/3611* (2013.01);
(Continued)

(58) Field of Classification Search
CPC .. G02B 27/22; G02B 27/2221; G02B 27/271; G09G 1/06; G09G 3/003; G09G 3/3611; G09G 3/3406; G09G 2310/0237; G09G 2310/0283; G09G 2320/0209; G09G 2320/041; G09G 2320/0252; G09G 2320/0257; G02F 1/133382; H04N 13/0438; H04N 13/0497
USPC .............................................. 345/101; 349/72
See application file for complete search history.

(56) References Cited

U.S. PATENT DOCUMENTS

| | | | | |
|---|---|---|---|---|
| 5,903,251 A | * | 5/1999 | Mori et al. ..................... | 345/101 |
| 2005/0057449 A1 | * | 3/2005 | Son ............................... | 345/60 |

(Continued)

FOREIGN PATENT DOCUMENTS

| | | |
|---|---|---|
| JP | 2004-287406 | 10/2004 |
| JP | 2004-336226 | 11/2004 |
| JP | 2006-126843 | 5/2006 |
| JP | 2007-65457 | 3/2007 |
| JP | 2008-256764 | 10/2008 |
| JP | 2009-271494 | 11/2009 |

OTHER PUBLICATIONS

International Search Report for PCT/JP2011/050344, mailed Apr. 19, 2011.
(Continued)

*Primary Examiner* — Aneet Yodichkas
*Assistant Examiner* — Brent D Castiaux
(74) *Attorney, Agent, or Firm* — Nixon & Vanderhye P.C.

(57) ABSTRACT

An LCD device (1) includes a liquid crystal display panel (2) and a liquid crystal driving section (4) for driving the liquid crystal display panel (2) from a region with a lower temperature to a region with a higher temperature in in-screen temperature distribution of the liquid crystal display panel (2) in operation. This configuration allows a scan direction (6) in which the liquid crystal display panel (2) is driven to correspond to temperature distribution direction (8) from a portion with a lower temperature to a portion with a higher temperature. As a result, image quality of images to be displayed by the general-purpose liquid crystal display panel (2) is improved.

4 Claims, 3 Drawing Sheets

(51) Int. Cl.
*H04N 13/00* (2006.01)
*G09G 3/00* (2006.01)
*G02F 1/1333* (2006.01)
*G09G 3/36* (2006.01)
*H04N 13/04* (2006.01)
*G09G 3/34* (2006.01)

(52) U.S. Cl.
CPC ....... *H04N13/0438* (2013.01); *H04N 13/0497* (2013.01); *G09G 3/3406* (2013.01); *G09G 2310/0237* (2013.01); *G09G 2310/0283* (2013.01); *G09G 2320/0209* (2013.01); *G09G 2320/0252* (2013.01); *G09G 2320/0257* (2013.01); *G09G 2320/041* (2013.01)

(56) References Cited

U.S. PATENT DOCUMENTS

| | | | |
|---|---|---|---|
| 2005/0156864 A1* | 7/2005 | Fujikura | 345/100 |
| 2006/0093825 A1* | 5/2006 | Lee et al. | 428/411.1 |
| 2007/0046615 A1 | 3/2007 | Tsuida et al. | |
| 2008/0036727 A1* | 2/2008 | Muto et al. | 345/101 |
| 2009/0103177 A1* | 4/2009 | Jang et al. | 359/462 |
| 2009/0273553 A1* | 11/2009 | Song et al. | 345/94 |

OTHER PUBLICATIONS

Non-English Written Opinion for PCT/JP2011/050344, mailed Apr. 19, 2011.

* cited by examiner

LCD DEVICE

This application is the U.S. national phase of International Application No. PCT/JP2011/050344 filed 12 Jan. 2011 which designated the U.S. and claims priority to JP Patent Application No. 2010-005253 filed 13 Jan. 2010, the entire contents of each of which are hereby incorporated by reference.

TECHNICAL FIELD

The present invention relates to an LCD device. To be more specific, the present invention relates to an LCD device capable of driving liquid crystal at a high speed.

BACKGROUND ART

Recently, LCD devices capable of displaying three-dimensional images have been developed actively. There are many techniques for displaying three-dimensional images. Among them, much attention has been paid to a technique for displaying three-dimensional images on a single liquid crystal display panel using time-division drive.

FIG. 5 is a view schematically showing a procedure of a conventional LCD device displaying a three-dimensional image by time-division drive. As shown in the drawing, when displaying a three-dimensional image by time-division drive, one frame period is divided into a plurality of sub-frame periods. In the example shown in FIG. 5, one frame period is divided into four sub-frame periods. In a case of driving a liquid crystal display panel at frame frequency of 60 Hz, one frame period is approximately 16.7 ms, so that one sub-frame period is approximately 4.2 ms. Accordingly, a right-eye image or a left-eye image is displayed per one sub-frame period (4.2 ms). In both cases of displaying a right-eye image and a left-eye image, the screen of the liquid crystal display panel is scanned from the upper portion thereof to the lower portion thereof.

In the example shown in FIG. 5, both in two sub-frame periods, a right-eye image is displayed, and both in subsequent two sub-frame periods, a left-eye image is displayed. At that time, while an image signal for the right-eye image is written in pixels, a backlight is turned off. Furthermore, at that time, the right-eye shutter glass is made off. Consequently, the right eye of the user does not see the right-eye image while it is written.

In the two successive sub-frame periods, at timing when an image signal for the right-eye image is completely written in pixels during the former sub-frame period, the right-eye shutter glass is put in an on-state. At that time, the backlight is still kept in the off-state. At timing when an image signal for the right-eye image is completely written in pixels during the latter sub-frame period, the backlight is put in an on-state. Consequently, a left-eye image is displayed on the whole screen at once, and the left-eye image is seen by the left eye of the user. The period in which the backlight is turned on is shorter than the sub-frame period. That is, flash light is outputted from the backlight.

After the right-eye image is completely displayed, a left-eye image is displayed in remaining two sub-frame periods in the same frame period. Specifically, in the two successive sub-frame periods, at timing when an image signal for the left-eye image is completely written in pixels during the former sub-frame period, the left-eye shutter glass is put in an on-state. At that time, the backlight is still kept in the off-state. At timing when an image signal for the left-eye image is completely written in pixels during the latter sub-frame period, the backlight is turned on. Consequently, a left-eye image is displayed on the whole screen at once, and the left-eye image is seen by the left eye of the user. The period in which the backlight is turned on is set to be shorter than the sub-frame period. That is, flash light is outputted from the backlight.

In theory, the above method enables a single liquid crystal display panel to appropriately display a three-dimensional image. However, in reality, there is a problem of crosstalk between images due to insufficient response speed of liquid crystal.

Prior to explaining this problem, initially, an explanation is made as to response speed of liquid crystal. FIG. 6 is a view showing falling response of liquid crystal. A graph 61 shown in the drawing indicates a relation between relative luminance of light transmitted by liquid crystal and a time required for a change in the relative luminance. According to the graph 61, it takes approximately 4 ms for the relative luminance to change from a peak value to 10% of the peak value (luminance difference indicated by the graph 61 of FIG. 6). Normally, falling response of this level allows two-dimensional image display without drop in image quality.

On the other hand, in a case of displaying a three-dimensional image by time-division drive, the falling response corresponding to luminance difference indicated by the graph 61 of FIG. 6 is not sufficient. Specifically, there is required such a falling response that luminance drops to 0.1% of its peak value as indicated by a graph 62 of FIG. 6. As indicated by a graph 60 of FIG. 6, it takes approximately 10 ms for luminance to drop to 0.1% of its peak value (luminance difference indicated by graph 62 of FIG. 6). The falling response of this level does not provide sufficient response speed of liquid crystal, so that there arises a problem that occurrence of crosstalk in displaying three-dimensional images drops image quality.

This problem is explained in more detail with reference to FIG. 5. In time-division drive shown in FIG. 5, there is a sufficient time from when scanning of the upper portion of a screen is started to when a backlight is turned on. This indicates that there is a sufficient response time for liquid crystal. Accordingly, at timing when the backlight is turned on, a response of liquid crystal to which a voltage was applied has been completed, and so orientation of the liquid crystal has changed in such a degree that enables light with targeted luminance to be transmitted.

On the other hand, scanning of the lower portion of the screen is started later than scanning of the upper portion, and so a time from when scanning of the lower portion is started to when the backlight is turned on is shorter than a time when scanning of the upper portion is started to when the backlight is turned on. Consequently, the liquid crystal does not have a sufficient response time. As a result, at the lower portion of the screen, the liquid crystal to which a voltage was applied has not responded sufficiently or has not responded at all. Therefore, orientation of the liquid crystal does not correspond to the level of an image signal written in the present sub-frame period, but corresponds to the level of an image signal written in the previous sub-frame period.

Consequently, there arises a problem that at timing when the backlight is turned on, the upper portion of the screen correctly displays a targeted image, whereas the lower portion of the screen cannot display the targeted image and instead displays a previous image. When displaying a three-dimensional image by time-division drive, a right-eye image and a left-eye image are displayed alternately. Consequently, the above problem results in displaying an image in which the right-eye image and the left-eye image are mixed partially. In order that a viewer views an exact three-dimensional image, it is essential to alternately display a right-eye image and a left-eye image in such a manner that the right-eye image and the left-eye image are completely separated. Therefore, displaying an image in which a right-eye image and a left-eye image are mixed would fatally drop image quality of a three-dimensional image.

On the other hand, conventionally, attention has been paid to a relation between the temperature of liquid crystal and response speed, and there have been developed LCD devices using this relation. For example, Patent Literature 1 discloses an LCD device including two liquid crystal display panels at front and rear sides superimposed with each other with a predetermined distance therebetween so that an image displayed on the liquid crystal display panel at the front side and an image displayed on the liquid crystal display panel at the rear side are superimposed with each other to form a stereoscopic image, wherein response time characteristics of the liquid crystal display panels at the front and rear sides, respectively, are different from each other at the same ambient temperature.

With this LCD device, a configuration of a plurality of liquid crystal display panels at front and rear sides superimposed with each other to form a stereoscopic image does not cause blurring of an image due to the difference in temperature between the liquid crystal display panels at the front and rear sides.

CITATION LIST

Patent Literatures

[Patent Literature 1]
Japanese Patent Application Publication No. 2008-256764 (published on Apr. 2, 2008)

SUMMARY OF INVENTION

Technical Problem

However, the technique disclosed in Patent Literature 1 requires a plurality of display panels superimposed with each other. Besides, the plurality of display panels are required to be designed such that the display panels are different with each other in terms of response speed of liquid crystal. Consequently, the configuration of the device gets complicated. Furthermore, when displaying a two-dimensional image, the technique suffers a low usage efficiency of light and requires a backlight of high output. This increases power consumption.

In view of the above, the image quality improvement technique disclosed in Patent Literature 1 is not applicable to a general-purpose display panel.

The present invention was made in view of the foregoing problems. An object of the present invention is to provide an LCD device capable of improving image quality of an image displayed on a general-purpose liquid crystal display panel.

Solution To Problem

In order to solve the foregoing problem, an LCD device of the present invention includes: a liquid crystal display panel; and a liquid crystal driving section for driving the liquid crystal display panel from a region with a lower temperature to a region with a higher temperature in in-screen temperature distribution of the liquid crystal display panel in operation.

With the arrangement, in the screen of the liquid crystal display panel, liquid crystal at the region with a higher temperature is driven later than liquid crystal at the region with a lower temperature. In general, liquid crystal has higher response speed as the temperature of the liquid crystal is higher. Accordingly, in one screen, liquid crystal driven later has higher response speed.

Consequently, at a region where scanning of the liquid crystal display panel is completed and which requires particularly high response speed of liquid crystal, the response speed of liquid crystal is improved. Accordingly, a problem that a part of an image in a previous frame remains in an image in a current frame is eliminated, so that image quality can be improved. Furthermore, since it is unnecessary to provide the liquid crystal display panel with any special function, it is possible to improve image quality of an image to be displayed by a general-purpose liquid crystal display panel.

For a fuller understanding of another object, characteristics, and advantages of the invention, reference should be made to the ensuing detailed description. Furthermore, advantages of the invention will be clearly understood in the ensuing explanation taken in conjunction with the accompanying drawings.

Advantageous Effects of Invention

The present invention yields an effect of improving image quality of an image to be displayed by a general-purpose liquid crystal display panel.

DESCRIPTION OF EMBODIMENTS

The following explains an embodiment of the present invention in detail with reference to FIGS. 1 to 4. It should be noted that various limitations preferable for carrying out the present invention will be described below, but the technical scope of the present invention is not limited to the embodiment and descriptions of the drawings below.

Configuration of LCD Device 1

Figure 1:
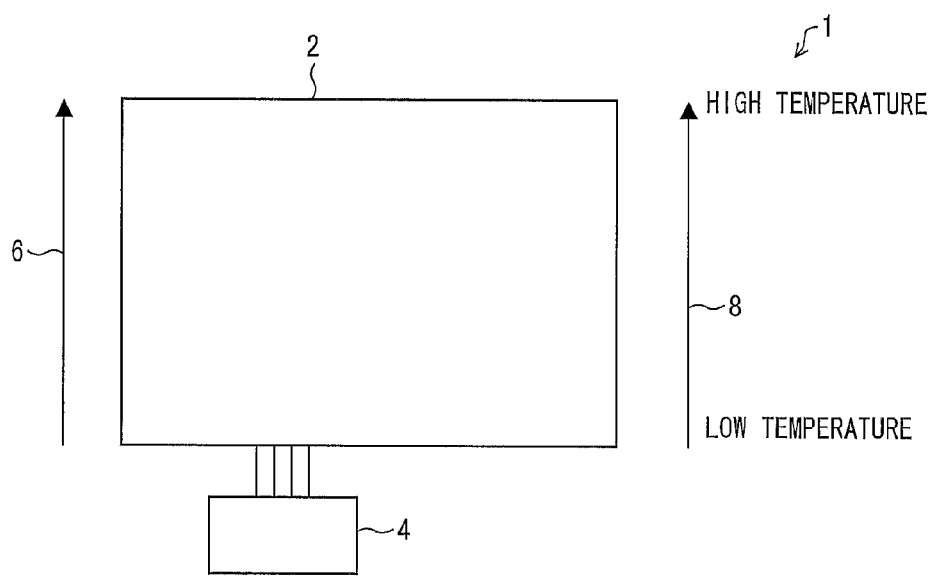
FIG. 1 is a view schematically showing a configuration of an LCD device in accordance with an embodiment of the present invention.

FIG. 1 is a view schematically showing a configuration of an LCD device 1 in accordance with an embodiment of the present invention. As shown in the drawing, the LCD device 1 includes a liquid crystal display panel 2 and a liquid crystal driving section 4. The liquid crystal display panel 2 is a so-called active matrix display panel, and controls transmittance of light by using a change in orientation of liquid crystal, thereby displaying an image. The liquid crystal display panel 2 can display both two-dimensional images and three-dimensional images, which will be detailed later. The liquid crystal driving section 4 is a so-called driver for driving the liquid crystal display panel 2 to display an image. The liquid crystal driving section 4 changes how to drive the liquid crystal display panel 2 according to the kinds of images to be displayed by the liquid crystal display panel 2.

In-Screen Temperature Distribution of Liquid Crystal Display Panel 2

Figure 2:
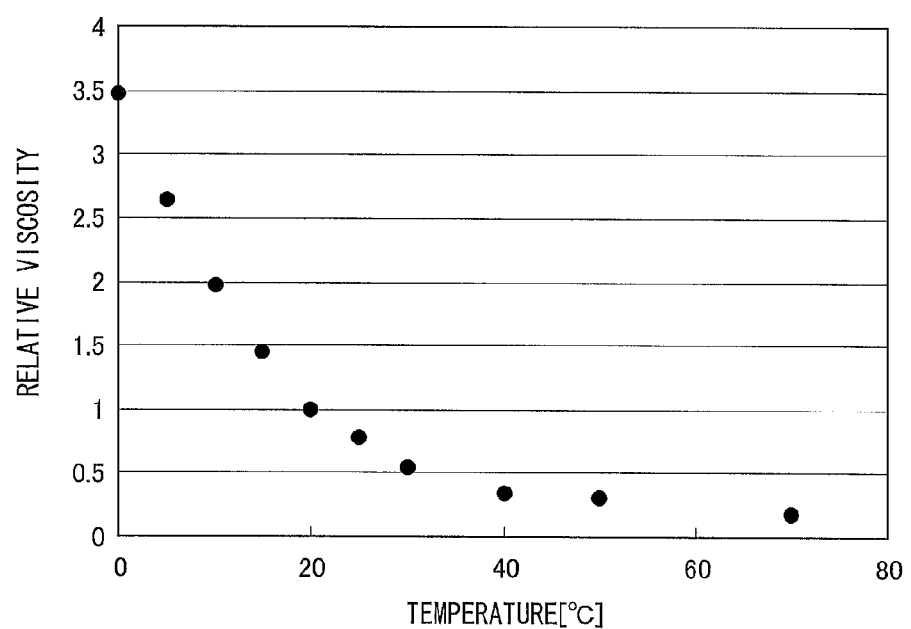
FIG. 2 is a view showing a relation between a temperature of liquid crystal and relative viscosity of the liquid crystal.

FIG. 2 is a view showing a relation between the temperature of liquid crystal and relative viscosity of the liquid crystal. A lateral axis indicates the temperature and a longitudinal axis indicates relative viscosity. As shown in the drawing, in general, viscosity (rotational viscosity) of liquid crystal is lower as the temperature is higher. For example, when relative viscosity of liquid crystal at 30° C. is 1, viscosity of liquid crystal at 40° C. is approximately 0.5. Furthermore, in general, response speed of liquid crystal is lower as the viscosity of liquid crystal is higher. That is, response speed of liquid crystal is higher as the temperature of liquid crystal is higher.

While the LCD device 1 operates, heat is propagated from a backlight to the liquid crystal display panel 2. The upper portion of a screen of the liquid crystal display panel 2 tends to accumulate heat compared with the lower portion of the screen. Consequently, the temperature of liquid crystal in a region at the lower portion of the screen is lower than the temperature of liquid crystal in a region at the upper portion of the screen. Since response speed of liquid crystal is higher as the temperature of liquid crystal is higher, response speed of liquid crystal in the region at the lower portion of the screen of the liquid crystal display panel is lower than response speed of liquid crystal in the region at the upper portion of the screen.

Consequently, in the liquid crystal display panel 2 in operation, there appears certain temperature distribution in the screen. Temperature distribution direction 8 from low temperature to high temperature at that time is equal to a direction from the lower portion of the screen to the upper portion of the screen in the liquid crystal display panel 2 as shown in FIG. 1.

The LCD device 1 can measure in-screen temperature distribution of the liquid crystal display panel in real time and set, based on the result of the measurement, a direction in which the liquid crystal display panel is to be driven. For example, an infrared thermograph of a camera type (e.g. TVS-200Ex manufactured by NEC Avio Infrared Technologies Co., Ltd.) is placed at a position with a predetermined distance from the LCD device 1, and the thermograph measures the temperature of the uppermost surface of the liquid crystal display panel 2 and transmits the result of the measurement to the LCD device 1. Use of the thermograph allows measurement of in-screen temperature distribution of, for example, a region of approximately 54×40 cm from a position 1 m away from the liquid crystal display panel 2 in real time (60 frames at most per sec.). Accordingly, it is possible to change, at practical speed, a direction in which the liquid crystal panel is to be driven in accordance with a change in the measured in-screen temperature distribution.

Driving of Liquid Crystal Display Panel 2

The liquid crystal driving section 4 causes a scan direction 6 in which the liquid crystal display panel 2 is to be driven to be equal to the temperature distribution direction 8. That is, the liquid crystal driving section 4 drives the liquid crystal display panel 2 in such a manner that the liquid crystal display panel 2 is driven from a region with a lower temperature (i.e. lower portion of screen) to a region with a higher temperature (i.e. upper portion of screen) in in-screen temperature distribution of the liquid crystal panel 2 in operation. The liquid crystal driving section 4 in accordance with the present embodiment drives pixels in the liquid crystal panel 2 with respect to every one line.

Consequently, in the screen of the liquid crystal display panel 2, liquid crystal at a region with a higher temperature is driven later than liquid crystal at a region with a lower temperature. As described above, response speed of liquid crystal is higher as the temperature of liquid crystal is higher. Accordingly, liquid crystal driven later in one screen exhibits higher response speed.

Consequently, at a region where scanning of the liquid crystal display panel 2 is completed and which requires particularly high response speed of liquid crystal, the response speed of liquid crystal is improved. Accordingly, a problem that a part of an image in a previous frame remains in an image in a current frame is eliminated, so that image quality can be improved. Furthermore, since it is unnecessary to provide the liquid crystal display panel 2 with any special function, e.g. it is unnecessary to provide the liquid crystal display panel 2 with new liquid crystal, it is possible to improve image quality of an image to be displayed by the general-purpose liquid crystal display panel 2.

The LCD device 1 includes a direct-type backlight (not shown) which emits light to the backside of the liquid crystal display panel 2. The liquid crystal driving section 4 drives the liquid crystal display panel 2 from the lower portion of the screen of the liquid crystal display panel 2 to the upper portion of the screen. Heat released from the direct-type backlight is propagated to the whole screen of the liquid crystal display panel 2, and the heat naturally gathers to the upper portion of the screen. This causes temperature distribution in which the temperature of a position in the screen is higher as the position is closer to the upper portion of the screen than to the lower portion of the screen. Therefore, by scanning the liquid crystal display panel 2 in a direction from the lower portion of the screen to the upper portion of the screen, it is possible to drive the liquid crystal display panel from a region with a lower temperature to a region with a higher temperature.

The backlight is not limited to a direct type and may be an edge type. In the case of the edge type, a portion of the liquid crystal display panel 2 which portion is close to a light source of the backlight is expected to exhibit a higher temperature than that of other portions.

In the liquid crystal display panel 2 in operation, the temperature of liquid crystal at the upper portion of the screen (region with a higher temperature) is higher by 10° C. or more than the temperature of liquid crystal at the lower portion of the screen (region with a lower temperature). This provides a sufficient difference in response speed between liquid crystal driven at first timing in the screen and liquid crystal driven later in the screen. Specifically, the latter liquid crystal responds sufficiently faster than the former liquid crystal. Consequently, an image in a previous frame is less likely to remain in an image in a present frame, so that image quality can be improved further.

Improvement In Image Quality of Three-Dimensional Image

As described above, the LCD device 1 can improve image quality of an image to be displayed by a general-purpose liquid crystal display panel. For that matter, it is possible to improve image quality of a three-dimensional image to be displayed by the liquid crystal display panel 2 by time-division drive. This will be explained below with reference to FIG. 3 by showing an example in which a region at the lower portion of the screen in the liquid crystal display panel 2 in operation exhibits 30° C. and a region at the upper portion of the screen exhibits 40° C.

Figure 3:
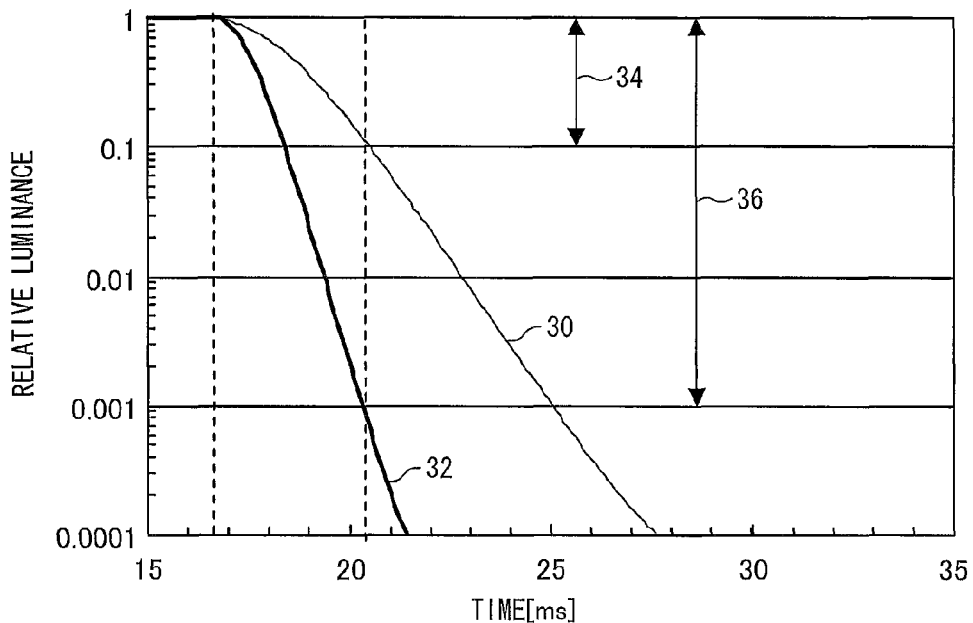
FIG. 3 is a view showing falling response of liquid crystal.

FIG. 3 is a view showing falling response of liquid crystal. Each of graphs 30 and 32 shown in the drawing indicate a relation between relative luminance of light transmitted by liquid crystal and a time required for a change in the relative luminance. The graph 30 indicates the relation when the temperature of liquid crystal is 30° C., and the graph 32 indicates the relation when the temperature of liquid crystal is 40° C. Both graphs were obtained by computer simulation.

According to the graph 30, when the temperature of liquid crystal is 30° C., it takes approximately 4 ms for the relative luminance to change from peak value to 10% of the peak value (luminance difference indicated by 34 in FIG. 3). Normally, falling response of this level is sufficient for displaying a two-dimensional image.

Figure 6:
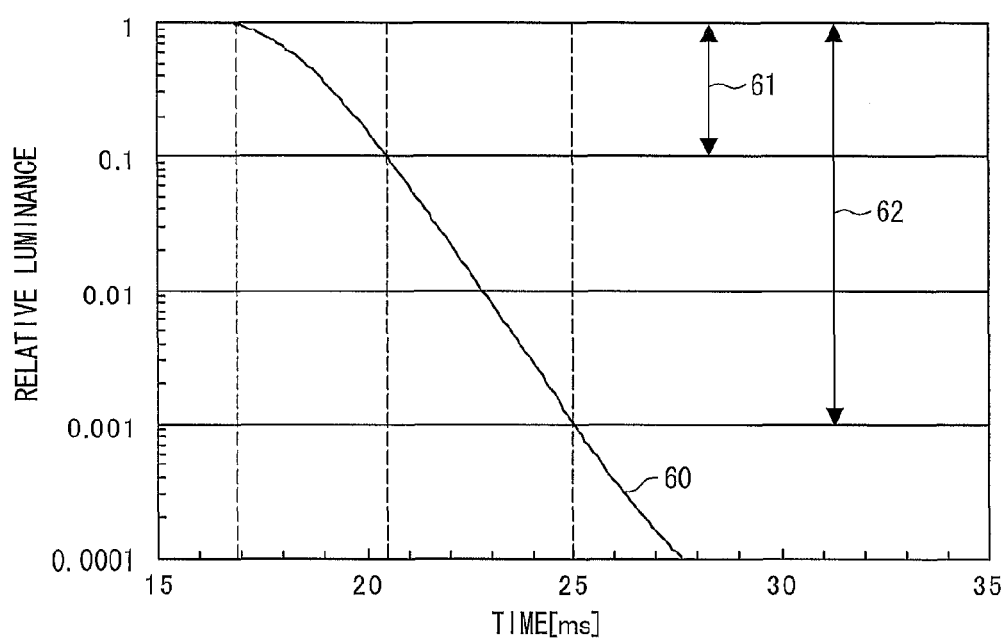
FIG. 6 is a view showing falling response of liquid crystal.

On the other hand, when displaying a three-dimensional image by time-division drive, falling response corresponding to luminance difference indicated by 34 of FIG. 3 is not sufficient. Specifically, there is required such a falling response that luminance drops to 0.1% of its peak value as indicated by a graph 36 of FIG. 3. Here, as indicated by the graph 32 of FIG. 6, in the case where the temperature of liquid crystal is 40° C., it takes approximately 4 ms for luminance to drop to 0.1% of its peak value. This falling response provides sufficient response speed of liquid crystal, so that liquid crystal can respond sufficiently at the time of completion of scanning. Consequently, the liquid crystal display panel 2 is free from crosstalk, and enjoys improved image quality.

Display of Three-Dimensional Image By Time-Division Drive

Figure 4:
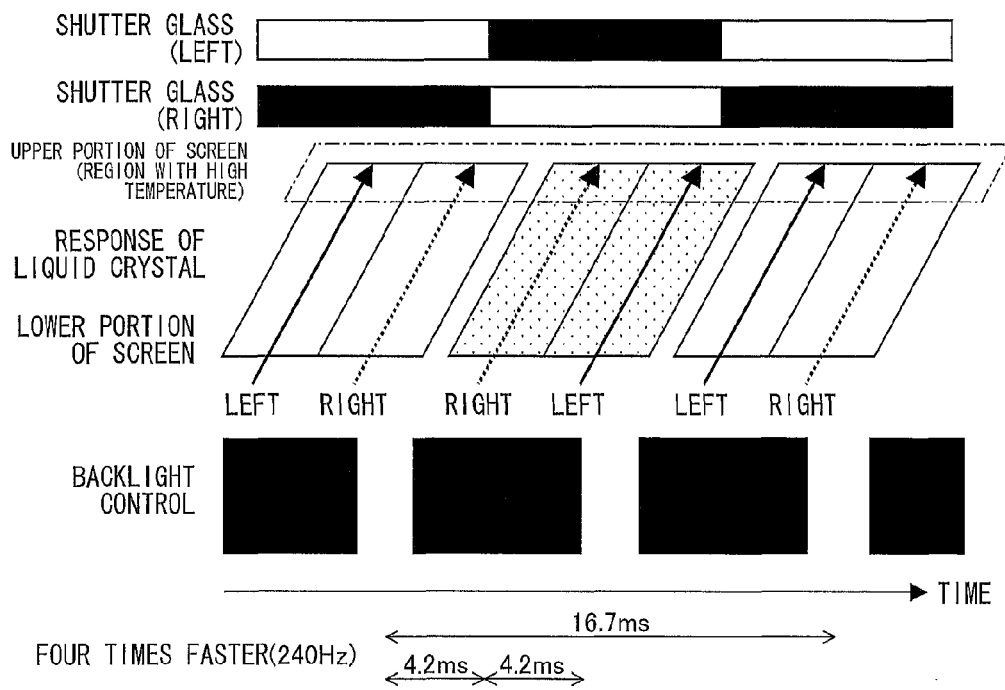
FIG. 4 is a view schematically showing a procedure of an LCD device in accordance with an embodiment of the present invention displaying a three-dimensional image by time-division drive.
Figure 5:
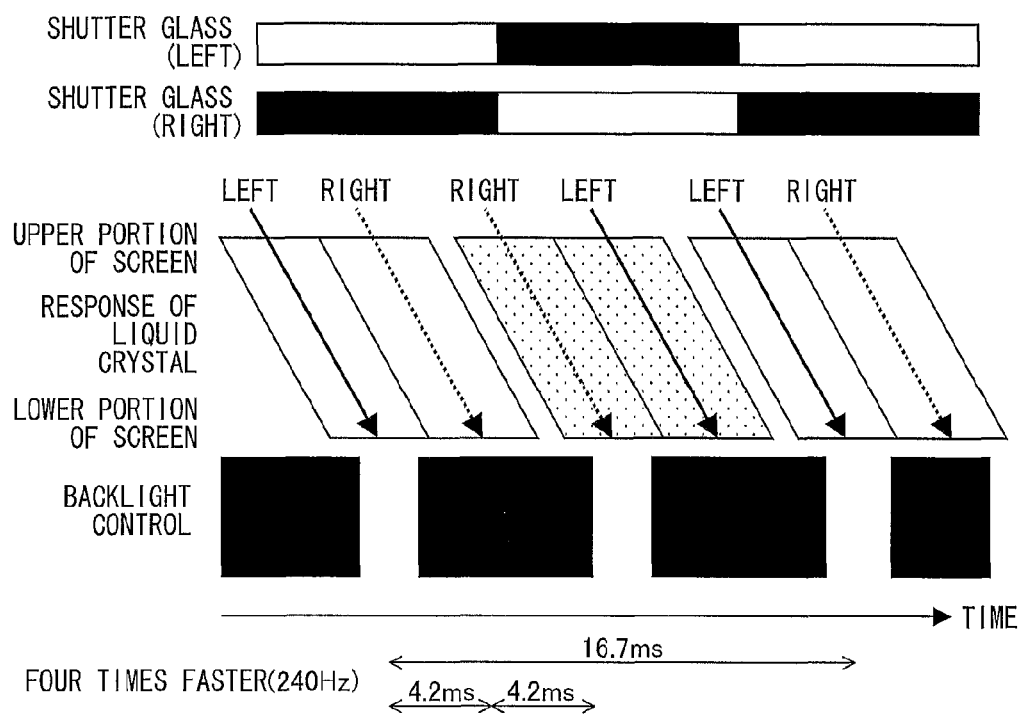
FIG. 5 is a view schematically showing a procedure of a conventional LCD device displaying a three-dimensional image by time-division drive.

FIG. 4 is a view schematically showing a procedure of the LCD device 1 displaying a three-dimensional image by time-division drive. As shown in the drawing, when displaying a three-dimensional image by time-division drive, the liquid crystal driving section 4 drives the liquid crystal display panel 2 at driving frequency higher than normal driving frequency. In the present embodiment, frame frequency is 60 Hz, and the liquid crystal display panel 2 is driven at the frequency of 240 Hz which is four times higher than 60 Hz. At that time, the liquid crystal driving section 4 (dividing means) divides one frame period into a plurality of sub-frame periods. In the example shown in FIG. 4, the number of division is 4. When driving the liquid crystal display panel at frame frequency of 60 Hz, one frame period is approximately 16.7 ms, and therefore one sub-frame period is approximately 4.2 ms. Accordingly, the liquid crystal driving section 4 supplies a right-eye image or a left-eye image to the liquid crystal display panel 2 with respect to each sub-frame period (4.2 ms). Consequently, the liquid crystal display panel displays a right-eye image or a left-eye image with respect to each sub-frame period. Both in displaying a right-eye image and a left-eye image, the screen of the liquid crystal display panel 2 is scanned from the lower portion thereof to the upper portion thereof.

In the example shown in FIG. 4, both in two sub-frame periods, a right-eye image is displayed, and both in subsequent two sub-frame periods, a left-eye image is displayed. At that time, while an image signal for the right-eye image is written in pixels, a backlight is turned off. Furthermore, at that time, the right-eye shutter glass is put in an off-state. Consequently, the right eye of the user does not see the right-eye image while it is written.

In the two successive sub-frame periods, at timing when an image signal for the right-eye image is completely written in pixels during the former sub-frame period, the right-eye shutter glass is put in an on-state. At that time, the backlight is still kept in the off-state. At timing when an image signal for the right-eye image is completely written in pixels during the latter sub-frame period, the backlight is turned on. Consequently, a left-eye image is displayed on the whole screen at once, and the left-eye image is seen by the left eye of the user. The period in which the backlight is turned on is shorter than the sub-frame period. That is, flash light is outputted from the backlight.

After the right-eye image is completely displayed, a left-eye image is displayed in the same frame period. Specifically, in the two successive sub-frame periods, at timing when an image signal for the right-eye image is completely written in pixels during the former sub-frame period, the left-eye shutter glass is put in an on-state. At that time, the backlight is still kept in the off-state. At timing when an image signal for the left-eye image is completely written in pixels during the latter sub-frame period, the backlight is turned on. Consequently, a left-eye image is displayed on the whole screen at once, and the left-eye image is seen by the left eye of the user. The period in which the backlight is turned on is shorter than the sub-frame period. That is, flash light is outputted from the backlight.

In the time-division drive shown in FIG. 4, the liquid crystal display panel 2 is driven sequentially from the lower portion of the screen to the upper portion of the screen. At the lower portion of the screen, there is a sufficient time from when scanning is started to when the backlight is turned on. Since liquid crystal has a sufficient response time, a response of liquid crystal to which a voltage was applied has been completed, and so orientation of the liquid crystal has changed in such a degree that enables light with targeted luminance to be transmitted.

On the other hand, scanning of the upper portion of the screen is started later than scanning of the upper portion, and so a time from when scanning of the lower portion is started to when the backlight is turned on is shorter than a time from when scanning of the upper portion is started to when the backlight is turned on. Accordingly, in theory, the liquid crystal at the upper portion does not have a sufficient response time. However, as described above, since the liquid crystal at the upper portion of the screen has a higher temperature than the liquid crystal at the lower portion of the screen, the liquid crystal at the upper portion has a higher response speed. Accordingly, in reality, the liquid crystal at the upper portion has a sufficient response time. Therefore, at the upper portion of the screen as well as the lower portion of the screen, at timing when the backlight is turned on, the liquid crystal to which a voltage was applied has responded completely. Consequently, the orientation of the liquid crystal has completely changed to a state corresponding to the level of an image signal written in the present sub-frame period, and does not kept in a state corresponding to the level of an image signal written in the previous sub-frame period.

The above configuration allows avoiding occurrence of crosstalk in the whole screen of a liquid crystal panel when an LCD device displays a three-dimensional image by time-division drive. This assures alternately displaying a right-eye image and a left-eye image in such a manner that the right-eye image and the left-eye image are separated completely.

Accordingly, it is possible to improve image quality of a displayed three-dimensional image.

The present invention is not limited to the description of the embodiments above, but may be altered by a skilled person within the scope of the claims. An embodiment based on a proper combination of technical means disclosed in different embodiments is encompassed in the technical scope of the present invention.

Display of Two-Dimensional Image

When a scan direction of a liquid crystal display panel while it is driven is different from a scan direction in which a two-dimensional image was captured, a user feels a great discomfort particularly when displaying a moving image. It is preferable that when the liquid crystal driving section 4 causes the liquid crystal display panel 2 to display a two-dimensional image, the scan direction of the liquid crystal display panel 2 while it is driven corresponds to the scan direction in which the two-dimensional image was captured. That is, in a case of displaying a two-dimensional image, when the scan direction in which the two-dimensional image was captured is different from a distribution direction (direction from low temperature to high temperature) of in-screen temperature distribution of the liquid crystal display panel 2, the scan direction of the liquid crystal display panel 2 while it is driven is preferentially corresponded with the scan direction in which the two-dimensional image was captured, not with the distribution direction of the in-screen temperature distribution. This allows displaying a two-dimensional image without a discomfort.

Information indicative of the scan direction in which a two-dimensional image was captured is stored beforehand, for example, in a memory of the LCD device 1. Alternatively, information indicative of the scan direction is given to a front portion of an input signal, and the LCD device 1 reads out the information to detect the scan direction in which the two-dimensional image was captured. The scan direction in which the two-dimensional image was captured can be identified by analyzing the signal itself. In this case, the signal is once stored in a frame memory and then is subjected to a predetermined signal process, thereby identifying the scan direction.

In a case of displaying a three-dimensional image by time-division drive, when a scan direction in which a three-dimensional image was captured is different from a distribution direction (direction from low temperature to high temperature) of in-screen temperature distribution of the liquid crystal display panel 2, a scan direction in which the liquid crystal display panel 2 is driven is preferentially corresponded with the distribution direction of in-screen temperature distribution of the liquid crystal display panel 2. When the scan direction of the liquid crystal panel 2 while it is driven is different from the scan direction in which the three-dimensional image was captured, a user does not feel a discomfort with respect to the displayed three-dimensional image. This is because when displaying a three-dimensional image by time-division drive, image signals are completely written in the whole screen of the liquid crystal display panel and then a backlight flashes to allow the screen to display an image.

Others

It is preferable to arrange the LCD device of the present invention such that the region with a higher temperature is higher in temperature by 10° C. or more than the region with a lower temperature.

With the arrangement, there is a sufficient difference in response speed between liquid crystal driven at first timing and liquid crystal driven later in a screen. Specifically, the liquid crystal driven later responses sufficiently faster than the liquid crystal driven at first timing. Consequently, an image in the previous frame is less likely to remain in an image in the present frame, so that image quality can be improved further.

It is preferable to arrange the LCD device of the present invention so as to further include dividing means for dividing one frame period into a plurality of sub-frame periods, the liquid crystal driving section supplying a right-eye signal or a left-eye signal to the liquid crystal display panel with respect to each sub-frame period.

With the arrangement, it is possible to improve image quality of a three-dimensional image displayed by time-division drive.

It is preferable to arrange the LCD device of the present invention such that when the liquid crystal display panel is driven to display a two-dimensional image, the liquid crystal display panel is driven in such a manner that a scan direction of the liquid crystal display panel while it is driven corresponds to a scan direction in which the two-dimensional image was captured.

With the arrangement, it is possible to yield an effect of displaying a two-dimensional image without a discomfort.

It is preferable to arrange the LCD device of the present invention so as to further include a direct backlight for emitting light to a backside of the liquid crystal display panel, the liquid crystal driving section driving the liquid crystal display panel from a lower portion of the screen of the liquid crystal display panel to an upper portion of the screen.

With the arrangement, heat released from the direct backlight is propagated to the whole screen of the liquid crystal display panel, and the heat naturally gathers to the upper portion of the screen. This causes temperature distribution in which the temperature of a position in the screen is higher as the position is closer to the upper portion of the screen than to the lower portion of the screen. Therefore, by scanning the liquid crystal display panel in a direction from the lower portion of the screen to the upper portion of the screen, it is possible to drive the liquid crystal display panel from a region with a lower temperature to a region with a higher temperature.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is widely usable as an LCD device which displays a three-dimensional image.

REFERENCE SIGNS LIST

1. LCD device
2. Liquid crystal display panel
4. Liquid crystal driving section
6. Scan direction
8. Temperature distribution direction
30. Graph
32. Graph
34. Luminance difference
36. Luminance difference

The invention claimed is:

1. An LCD device, comprising:

a liquid crystal display panel; and a liquid crystal driving section for driving the liquid crystal display panel from a region with a lower temperature to a region with a higher temperature in in-screen temperature distribution of the liquid crystal display panel in operation, the liquid crystal driving section driving the liquid crystal display panel in accordance with in-screen temperature distribution of the liquid crystal display panel which distribution is measured in real time, and wherein the liquid crystal driving section changes a direction in which the liquid crystal display panel is to be driven in accordance with a change in the in-screen temperature distribution of the liquid crystal panel which distribution is measured in real time;

wherein:

in a case where, when the liquid crystal panel displays a two-dimensional image, a scan direction in which the two-dimensional image is captured is different from a distribution direction extending from the region with a lower temperature to the region with a higher temperature in the in-screen temperature distribution, the liquid crystal display driving section causes the direction in which the liquid crystal panel is to be driven to correspond to the scan direction in which the two-dimensional image is captured, and in a case where, when the liquid crystal panel displays a three-dimensional image, a scan direction in which the three-dimensional image is captured is different from the distribution direction, the liquid crystal display driving section causes the direction in which the liquid crystal panel is to be driven to correspond to the distribution direction.

2. The LCD device as set forth in claim 1, wherein the region with a higher temperature is higher in temperature by 10° C. or more than the region with a lower temperature.

3. The LCD device as set forth in claim 1, further comprising dividing means for dividing one frame period into a plurality of sub-frame periods, the liquid crystal driving section supplying a right-eye signal or a left-eye signal to the liquid crystal display panel with respect to each sub-frame period.

4. The LCD device as set forth in claim 1, further comprising a direct backlight for emitting light to a backside of the liquid crystal display panel, the liquid crystal driving section driving the liquid crystal display panel from a lower portion of the screen of the liquid crystal display panel to an upper portion of the screen.

* * * * *